(12) United States Patent
Wade

(10) Patent No.: US 9,633,236 B1
(45) Date of Patent: Apr. 25, 2017

(54) POWER HARVESTING IN READER DEVICES

(71) Applicant: Square, Inc., San Francisco, CA (US)

(72) Inventor: Jeremy Wade, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 73 days.

(21) Appl. No.: 14/306,041

(22) Filed: Jun. 16, 2014

Related U.S. Application Data

(60) Provisional application No. 61/914,762, filed on Dec. 11, 2013.

(51) Int. Cl.
*G06K 7/01* (2006.01)
*G06K 7/08* (2006.01)

(52) U.S. Cl.
CPC ............... *G06K 7/01* (2013.01); *G06K 7/082* (2013.01)

(58) Field of Classification Search
USPC ........................................................ 235/449
See application file for complete search history.

(56) References Cited

U.S. PATENT DOCUMENTS

| | | |
|---|---|---|
| 3,854,036 A | 12/1974 | Gupta |
| 4,035,614 A | 7/1977 | Frattarola et al. |
| 4,254,441 A | 3/1981 | Fisher |
| 4,591,937 A | 5/1986 | Nakarai et al. |
| 4,609,957 A | 9/1986 | Gentet et al. |
| 4,727,544 A | 2/1988 | Brunner et al. |
| 4,788,420 A | 11/1988 | Chang et al. |
| 4,845,740 A | 7/1989 | Tokuyama et al. |
| 5,173,597 A | 12/1992 | Anglin |
| 5,266,789 A | 11/1993 | Anglin et al. |
| 5,406,627 A | 4/1995 | Thompson et al. |
| 5,434,395 A | 7/1995 | Storck et al. |
| 5,434,400 A | 7/1995 | Scherzer |

(Continued)

FOREIGN PATENT DOCUMENTS

| | | |
|---|---|---|
| CA | 2 812 251 A1 | 4/2012 |
| CA | 2 920 589 A1 | 8/2016 |

(Continued)

OTHER PUBLICATIONS

"What is a Coupling Capacitor," Retrieved from the Internet URL: http://www.learningaboutelectronics.com/Articles/What-is-a-coupling-capacitor, on Mar. 21, 2016, pp. 1-4.

(Continued)

*Primary Examiner* — Michael G Lee
*Assistant Examiner* — David Tardif
(74) *Attorney, Agent, or Firm* — Polsinelli PC

(57) ABSTRACT

Aspects of the subject disclosure provide a reader device for processing payment cards. The reader device is configured to harvest power from received audio signals, for example, from analog signals received on an audio bus, such as a standard 3.5 mm audio channel. In some implementations, a reader of the current technology includes a microcontroller configured to perform operations including receiving an audio signal from the host via the audio bus, analyzing the audio signal to determine when a voltage of the audio signal is negative and providing a reference signal to the power module, wherein the reference signal indicates time periods in which synchronous rectification is to be performed by the power module.

20 Claims, 5 Drawing Sheets

(56) References Cited

U.S. PATENT DOCUMENTS

| | | |
|---|---|---|
| 5,463,678 A | 10/1995 | Kepley, III et al. |
| 5,589,855 A | 12/1996 | Blumstein et al. |
| 5,603,078 A | 2/1997 | Henderson et al. |
| 5,616,904 A | 4/1997 | Fernadez |
| 5,679,943 A | 10/1997 | Schultz et al. |
| 5,729,591 A | 3/1998 | Bailey |
| 5,764,742 A | 6/1998 | Howard et al. |
| 5,850,599 A | 12/1998 | Seiderman |
| 5,878,337 A | 3/1999 | Joao et al. |
| 5,907,801 A | 5/1999 | Albert et al. |
| 5,945,654 A | 8/1999 | Huang |
| 5,991,410 A | 11/1999 | Albert et al. |
| 5,991,749 A | 11/1999 | Morrill, Jr. |
| D417,442 S | 12/1999 | Butts et al. |
| 6,006,109 A | 12/1999 | Shin |
| 6,010,067 A | 1/2000 | Elbaum |
| 6,021,944 A | 2/2000 | Arakaki |
| 6,032,859 A | 3/2000 | Hughes et al. |
| 6,061,666 A | 5/2000 | Do et al. |
| 6,095,410 A | 8/2000 | Andersen et al. |
| 6,129,277 A | 10/2000 | Grant et al. |
| 6,234,389 B1 | 5/2001 | Valliani et al. |
| 6,308,227 B1 | 10/2001 | Kumar et al. |
| 6,363,139 B1 | 3/2002 | Zurek et al. |
| 6,400,517 B1 | 6/2002 | Murao |
| 6,431,445 B1 | 8/2002 | Deland et al. |
| 6,476,743 B1 | 11/2002 | Brown et al. |
| 6,481,623 B1 | 11/2002 | Grant et al. |
| 6,497,368 B1 | 12/2002 | Friend et al. |
| 6,536,670 B1 | 3/2003 | Postman et al. |
| D477,321 S | 7/2003 | Baughman |
| 6,612,488 B2 | 9/2003 | Suzuki |
| 6,813,608 B1 | 11/2004 | Baranowski |
| 6,832,721 B2 | 12/2004 | Fujii |
| 6,850,147 B2 | 2/2005 | Prokoski et al. |
| 6,868,391 B1 | 3/2005 | Hultgren |
| 6,896,182 B2 | 5/2005 | Sakaguchi |
| 6,944,782 B2 | 9/2005 | von Mueller et al. |
| 6,979,231 B2 | 12/2005 | Shinohara |
| 7,003,316 B1 | 2/2006 | Elias et al. |
| 7,013,149 B2 | 3/2006 | Vetro et al. |
| 7,149,296 B2 | 12/2006 | Brown et al. |
| 7,167,711 B1 | 1/2007 | Dennis |
| 7,252,232 B2 | 8/2007 | Fernandes et al. |
| 7,309,012 B2 | 12/2007 | Von Mueller et al. |
| 7,324,836 B2 | 1/2008 | Steenstra et al. |
| D575,056 S | 8/2008 | Tan |
| 7,409,234 B2 | 8/2008 | Glezerman |
| 7,424,732 B2 | 9/2008 | Matsumoto et al. |
| 7,433,452 B2 | 10/2008 | Taylor et al. |
| 7,505,762 B2 | 3/2009 | Onyon et al. |
| 7,506,812 B2 | 3/2009 | von Mueller et al. |
| D590,828 S | 4/2009 | Sherrod et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| D607,000 S | 12/2009 | Cheng et al. |
| 7,668,308 B1 | 2/2010 | Wurtz |
| 7,703,676 B2 | 4/2010 | Hart et al. |
| 7,708,189 B1 | 5/2010 | Cipriano |
| 7,757,953 B2 | 7/2010 | Hart et al. |
| 7,793,834 B2 | 9/2010 | Hachey et al. |
| 7,810,729 B2 | 10/2010 | Morley, Jr. |
| 7,869,591 B1 | 1/2011 | Nagel et al. |
| 7,945,494 B2 | 5/2011 | Williams |
| 8,011,587 B2 | 9/2011 | Johnson et al. |
| 8,015,070 B2 | 9/2011 | Sinha et al. |
| D646,264 S | 10/2011 | Dong |
| D653,664 S | 2/2012 | Turnbull et al. |
| 8,132,670 B1 | 3/2012 | Chen |
| 8,231,055 B2 | 7/2012 | Wen |
| 8,297,507 B2 | 10/2012 | Kayani |
| 8,302,860 B2 | 11/2012 | McKelvey |
| 8,336,771 B2 | 12/2012 | Tsai et al. |
| D675,618 S | 2/2013 | Behar et al. |
| 8,376,239 B1 | 2/2013 | Humphrey |
| D677,667 S | 3/2013 | Smith et al. |
| D679,714 S | 4/2013 | Smith et al. |
| D680,537 S | 4/2013 | Miller et al. |
| 8,413,901 B2 | 4/2013 | Wen |
| 8,452,004 B2 | 5/2013 | Lee |
| D686,208 S | 7/2013 | Miller et al. |
| 8,500,010 B1 | 8/2013 | Marcus et al. |
| 8,500,018 B2 | 8/2013 | McKelvey et al. |
| 8,560,823 B1 | 10/2013 | Aytek et al. |
| 8,571,989 B2 | 10/2013 | Dorsey et al. |
| 8,573,486 B2 | 11/2013 | McKelvey et al. |
| 8,573,487 B2 | 11/2013 | McKelvey |
| 8,573,489 B2 | 11/2013 | Dorsey et al. |
| 8,584,946 B2 | 11/2013 | Morley, Jr. |
| 8,584,956 B2 | 11/2013 | Wilson et al. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,640,953 B2 | 2/2014 | Dorsey et al. |
| D700,606 S | 3/2014 | Lo |
| 8,662,389 B2 | 3/2014 | Dorsey et al. |
| 8,678,277 B2 | 3/2014 | Dorsey et al. |
| D703,211 S | 4/2014 | Weller et al. |
| 8,701,996 B2 | 4/2014 | Dorsey et al. |
| 8,701,997 B2 | 4/2014 | Dorsey et al. |
| D706,266 S | 6/2014 | Rotsaert |
| 8,740,072 B1 | 6/2014 | Dorogusker |
| 8,763,900 B2 | 7/2014 | Marcus et al. |
| D711,876 S | 8/2014 | McWilliam et al. |
| 8,794,517 B1 | 8/2014 | Templeton et al. |
| D712,892 S | 9/2014 | Hong et al. |
| 8,820,650 B2 | 9/2014 | Wilson et al. |
| 8,840,017 B2 | 9/2014 | Chan et al. |
| 8,840,024 B2 | 9/2014 | McKelvey et al. |
| 8,870,070 B2 | 10/2014 | McKelvey et al. |
| 8,870,071 B2 | 10/2014 | McKelvey |
| 8,876,003 B2 | 11/2014 | McKelvey |
| 8,910,868 B1 | 12/2014 | Wade et al. |
| 8,931,699 B1 | 1/2015 | Wade et al. |
| D724,094 S | 3/2015 | Blochinger et al. |
| D725,655 S | 3/2015 | Debaigue et al. |
| 8,967,465 B1 | 3/2015 | Wade et al. |
| D726,171 S | 4/2015 | Edwards |
| 9,016,570 B1 | 4/2015 | Gluck |
| 9,016,572 B2 | 4/2015 | Babu et al. |
| D728,549 S | 5/2015 | Su et al. |
| D728,568 S | 5/2015 | Debaigue et al. |
| D731,493 S | 6/2015 | Mills |
| 9,063,737 B2 | 6/2015 | Babu et al. |
| D740,820 S | 10/2015 | Templeton et al. |
| 9,218,517 B2 | 12/2015 | Morley, Jr. |
| 9,237,401 B2 | 1/2016 | Modi et al. |
| 9,256,769 B1 | 2/2016 | Lamfalusi et al. |
| 9,256,770 B1 | 2/2016 | Edwards |
| 9,355,285 B1 | 5/2016 | Wade et al. |
| D762,651 S | 8/2016 | Edwards et al. |
| 2001/0001856 A1 | 5/2001 | Gould et al. |
| 2002/0002507 A1 | 1/2002 | Hatakeyama |
| 2002/0017568 A1 | 2/2002 | Grant et al. |
| 2002/0030871 A1 | 3/2002 | Anderson et al. |
| 2002/0073304 A1 | 6/2002 | Marsh et al. |
| 2002/0077974 A1 | 6/2002 | Ortiz |
| 2002/0099648 A1 | 7/2002 | DeVoe et al. |
| 2002/0108062 A1 | 8/2002 | Nakajima et al. |
| 2002/0165462 A1 | 11/2002 | Westbrook et al. |
| 2002/0169541 A1 | 11/2002 | Bouve et al. |
| 2002/0188535 A1 | 12/2002 | Chao et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2004/0011650 A1 | 1/2004 | Zenhausern et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |

(56) References Cited

U.S. PATENT DOCUMENTS

| | | |
|---|---|---|
| 2004/0104268 A1 | 6/2004 | Bailey |
| 2004/0127256 A1 | 7/2004 | Goldthwaite et al. |
| 2004/0128256 A1 | 7/2004 | Dhanjal et al. |
| 2004/0151026 A1 | 8/2004 | Naso et al. |
| 2004/0178326 A1 | 9/2004 | Hamilton et al. |
| 2004/0204074 A1 | 10/2004 | Desai |
| 2004/0204082 A1 | 10/2004 | Abeyta |
| 2004/0230489 A1 | 11/2004 | Goldthwaite et al. |
| 2004/0230526 A1 | 11/2004 | Praisner |
| 2005/0009004 A1 | 1/2005 | Xu et al. |
| 2005/0010702 A1 | 1/2005 | Saito et al. |
| 2005/0023348 A1 | 2/2005 | Lucas et al. |
| 2005/0077870 A1 | 4/2005 | Ha et al. |
| 2005/0156037 A1 | 7/2005 | Wurzburg |
| 2005/0156038 A1 | 7/2005 | Wurzburg |
| 2005/0164631 A1 | 7/2005 | Jin |
| 2005/0167496 A1 | 8/2005 | Morley, Jr. et al. |
| 2005/0194452 A1 | 9/2005 | Nordentoft et al. |
| 2005/0209719 A1 | 9/2005 | Beckert et al. |
| 2005/0219728 A1 | 10/2005 | Durbin et al. |
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2006/0000917 A1 | 1/2006 | Kim et al. |
| 2006/0049255 A1 | 3/2006 | Von Mueller et al. |
| 2006/0094481 A1 | 5/2006 | Gullickson |
| 2006/0122902 A1 | 6/2006 | Petrov et al. |
| 2006/0152276 A1 | 7/2006 | Barksdale |
| 2006/0208066 A1 | 9/2006 | Finn et al. |
| 2006/0219776 A1* | 10/2006 | Finn .................. B60R 25/25 235/380 |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2007/0287498 A1 | 12/2007 | Wang et al. |
| 2008/0011850 A1 | 1/2008 | Henry |
| 2008/0017712 A1 | 1/2008 | Hart et al. |
| 2008/0027815 A1 | 1/2008 | Johnson et al. |
| 2008/0040265 A1 | 2/2008 | Rackley III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0103972 A1 | 5/2008 | Lanc |
| 2008/0147564 A1 | 6/2008 | Singhal |
| 2008/0172306 A1 | 7/2008 | Schorr et al. |
| 2008/0177662 A1 | 7/2008 | Smith et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2008/0294766 A1 | 11/2008 | Wang et al. |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0166422 A1 | 7/2009 | Biskupski |
| 2009/0180354 A1 | 7/2009 | Sander et al. |
| 2009/0187492 A1 | 7/2009 | Hammad et al. |
| 2009/0302806 A1 | 12/2009 | Lindlar et al. |
| 2010/0063893 A1 | 3/2010 | Townsend |
| 2010/0108762 A1 | 5/2010 | Morley, Jr. |
| 2010/0127857 A1 | 5/2010 | Kilmurray et al. |
| 2010/0128900 A1 | 5/2010 | Johnson |
| 2010/0184479 A1 | 7/2010 | Griffin, Jr. |
| 2010/0222000 A1 | 9/2010 | Sauer et al. |
| 2010/0241838 A1 | 9/2010 | Cohen et al. |
| 2010/0243732 A1 | 9/2010 | Wallner |
| 2010/0260341 A1 | 10/2010 | Sander et al. |
| 2010/0289390 A1 | 11/2010 | Kenney |
| 2010/0314446 A1 | 12/2010 | Morley, Jr. |
| 2011/0033910 A1 | 2/2011 | Yamanaka et al. |
| 2011/0053560 A1 | 3/2011 | Jain et al. |
| 2011/0062235 A1 | 3/2011 | Morley, Jr. |
| 2011/0084131 A1 | 4/2011 | McKelvey |
| 2011/0084139 A1 | 4/2011 | McKelvey et al. |
| 2011/0084140 A1 | 4/2011 | Wen |
| 2011/0137803 A1 | 6/2011 | Willins |
| 2011/0161235 A1 | 6/2011 | Beenau et al. |
| 2011/0165896 A1 | 7/2011 | Stromberg et al. |
| 2011/0174879 A1 | 7/2011 | Morley, Jr. |
| 2011/0180601 A1 | 7/2011 | Morley, Jr. |
| 2011/0191196 A1 | 8/2011 | Orr et al. |
| 2011/0198395 A1 | 8/2011 | Chen |
| 2011/0202463 A1 | 8/2011 | Powell |
| 2011/0231272 A1 | 9/2011 | Englund et al. |
| 2011/0258120 A1 | 10/2011 | Weiss |
| 2011/0313880 A1 | 12/2011 | Paul et al. |
| 2012/0008851 A1 | 1/2012 | Pennock et al. |
| 2012/0011024 A1 | 1/2012 | Dorsey et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0026018 A1 | 2/2012 | Lin |
| 2012/0052910 A1 | 3/2012 | Mu et al. |
| 2012/0095869 A1 | 4/2012 | McKelvey |
| 2012/0095870 A1 | 4/2012 | McKelvey |
| 2012/0097739 A1 | 4/2012 | Babu et al. |
| 2012/0097740 A1 | 4/2012 | Lamba et al. |
| 2012/0118956 A1 | 5/2012 | Lamba |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0234918 A1 | 9/2012 | Lindsay |
| 2012/0246074 A1 | 9/2012 | Annamalai et al. |
| 2012/0259651 A1 | 10/2012 | Mallon et al. |
| 2012/0270528 A1 | 10/2012 | Goodman |
| 2013/0021046 A1 | 1/2013 | Prentice et al. |
| 2013/0031003 A1 | 1/2013 | Dorsey et al. |
| 2013/0031004 A1 | 1/2013 | Dorsey et al. |
| 2013/0087614 A1 | 4/2013 | Limtao et al. |
| 2013/0137367 A1 | 5/2013 | Fisher |
| 2013/0200147 A1 | 8/2013 | Dorsey et al. |
| 2013/0200148 A1 | 8/2013 | Dorsey et al. |
| 2013/0200149 A1 | 8/2013 | Dorsey et al. |
| 2013/0200153 A1 | 8/2013 | Dorsey et al. |
| 2013/0200154 A1 | 8/2013 | Dorsey et al. |
| 2013/0204788 A1 | 8/2013 | Dorsey et al. |
| 2013/0204791 A1 | 8/2013 | Dorsey et al. |
| 2013/0204792 A1 | 8/2013 | Dorsey et al. |
| 2013/0207481 A1 | 8/2013 | Gobburu et al. |
| 2013/0254117 A1 | 9/2013 | von Mueller et al. |
| 2013/0254118 A1 | 9/2013 | Dorsey et al. |
| 2013/0290762 A1 | 10/2013 | Pawar |

(56) References Cited

U.S. PATENT DOCUMENTS

| | | | |
|---|---|---|---|
| 2013/0299575 | A1 | 11/2013 | McKelvey et al. |
| 2013/0304244 | A1 | 11/2013 | Ojanper |
| 2013/0320089 | A1 | 12/2013 | Marcus et al. |
| 2014/0001257 | A1 | 1/2014 | Dorsey et al. |
| 2014/0001263 | A1 | 1/2014 | Babu et al. |
| 2014/0017955 | A1 | 1/2014 | Lo et al. |
| 2014/0018016 | A1 | 1/2014 | Chang et al. |
| 2014/0061301 | A1 | 3/2014 | Cho et al. |
| 2014/0076964 | A1 | 3/2014 | Morley, Jr. |
| 2014/0089205 | A1 | 3/2014 | Kapur et al. |
| 2014/0097242 | A1 | 4/2014 | McKelvey |
| 2014/0124576 | A1* | 5/2014 | Zhou ............... G06K 7/084 235/449 |
| 2014/0131442 | A1 | 5/2014 | Morrow et al. |
| 2014/0144983 | A1 | 5/2014 | Dorsey et al. |
| 2014/0203082 | A1 | 7/2014 | Huh |
| 2014/0258132 | A1 | 9/2014 | Swamy et al. |
| 2014/0265642 | A1* | 9/2014 | Utley ............... H02J 1/06 307/151 |
| 2014/0295761 | A1 | 10/2014 | Lo |
| 2014/0297539 | A1* | 10/2014 | Swamy ............ G06K 7/0004 705/71 |
| 2015/0078560 | A1 | 3/2015 | Ilango et al. |
| 2015/0100495 | A1 | 4/2015 | Salama et al. |
| 2015/0149992 | A1 | 5/2015 | Wade et al. |
| 2015/0161419 | A1 | 6/2015 | Wade et al. |
| 2015/0199677 | A1 | 7/2015 | Wade et al. |
| 2016/0055478 | A1 | 2/2016 | Skoog |
| 2016/0070940 | A1 | 3/2016 | Lamba et al. |
| 2016/0132703 | A1 | 5/2016 | Lamfalusi et al. |
| 2016/0188915 | A1 | 6/2016 | Babu et al. |
| 2016/0203466 | A1 | 7/2016 | Lamba et al. |
| 2016/0203667 | A1 | 7/2016 | Lamba et al. |
| 2016/0239691 | A1 | 8/2016 | Wade et al. |
| 2016/0371513 | A1 | 12/2016 | Lamba et al. |

FOREIGN PATENT DOCUMENTS

| | | |
|---|---|---|
| CN | 302341093 S | 3/2013 |
| CN | 302526592 S | 8/2013 |
| EP | 1 145 766 A2 | 10/2001 |
| EP | 2 693 298 A2 | 2/2014 |
| EP | 3 091 474 A1 | 11/2016 |
| HK | 1211124 A1 | 5/2016 |
| JP | 2003-108777 A | 4/2003 |
| JP | 2004-078662 A | 3/2004 |
| JP | 2005-063869 A | 3/2005 |
| JP | 2005-242550 A | 9/2005 |
| JP | 2005-269172 A | 9/2005 |
| JP | 2009-199649 A | 9/2009 |
| JP | 2001-313714 A | 11/2011 |
| JP | 2013-518344 A | 5/2013 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A1 | 10/2002 |
| WO | 2007/070592 A2 | 6/2007 |
| WO | 2009/128483 A1 | 10/2009 |
| WO | 2010/097711 A2 | 9/2010 |
| WO | 2010/111130 | 9/2010 |
| WO | 2010/135174 A1 | 11/2010 |
| WO | 2011/047028 A2 | 4/2011 |
| WO | 2011/047030 A2 | 4/2011 |
| WO | 2012/051070 A2 | 4/2012 |
| WO | 2013/009891 A1 | 1/2013 |
| WO | 2013/074499 A1 | 5/2013 |
| WO | 2015/081002 A1 | 6/2015 |
| WO | 2015/089301 A1 | 6/2015 |
| WO | 2016/028823 A1 | 2/2016 |

OTHER PUBLICATIONS

Examiner's Report for Canadian Industrial Design Application No. 159528, mailed on Dec. 1, 2015.
Notice of Allowance mailed Jan. 29, 2016, for U.S. Appl. No. 13/298,501, of Babu, A., et al., filed Nov. 17, 2011.
Notice of Allowance mailed Jan. 29, 2016, for U.S. Appl. No. 13/298,534, of Lamba, K., et al., filed Nov. 17, 2011.
Final Office Action mailed Feb. 1, 2016, for U.S. Appl. No. 13/298,560, of Lamba, K., et al., filed Nov. 17, 2011.
Notice of Allowance mailed Feb. 5, 2016, for U.S. Appl. No. 14/620,699, of Wade, J., et al., filed Feb. 12, 2015.
Non-Final Office Action mailed Feb. 25, 2016, for U.S. Appl. No. 14/979,407, of Lamfalusi, M., et al., filed Dec. 27, 2015.
Examiner Requisition for Canadian Application No. 2,812,594, mailed on Feb. 26, 2016.
Non-Final Office Action mailed Mar. 1, 2016, for U.S. Appl. No. 14/942,515, of Lamba, K., et al., filed Nov. 16, 2015.
Notice of Allowance mailed Mar. 28, 2016, for Design U.S. Appl. No. 29/493,212, of Edwards, T., et al., filed Jun. 6, 2014.
English-language translation of Final Rejection for Japanese Application No. 2014-025525, mailed Oct. 20, 2015.
Notice of Allowance mailed Nov. 13, 2015 for U.S. Appl. No. 13/298,487, of Lamba, K., et al., filed Nov. 17, 2011.
Corrected Notice of Allowance mailed Nov. 18, 2015, for U.S. Appl. No. 14/578,107, of Wade, J., et al., filed Dec. 19, 2014.
Notice of Allowance mailed Nov. 19, 2015 for U.S. Appl. No. 13/298,491, of Lamba, K., et al., filed Nov. 17, 2011.
Corrected Notice of Allowance mailed Nov. 19, 2015 for U.S. Appl. No. 13/298,510, of Lamba, K., et al., filed Nov. 17, 2011.
Notice of Allowance mailed Nov. 20, 2015 for U.S. Appl. No. 13/298,501, of Babu, A., et al., filed Nov. 17, 2011.
Ex parte Quayle Action mailed Nov. 20, 2015 for U.S. Appl. No. 14/620,699, of Wade, J., et al., filed Feb. 12, 2015.
Notice of Allowance mailed Nov. 23, 2015 for U.S. Appl. No. 14/189,997, of Lamfalusi, M., et al., filed Feb. 25, 2014.
Non-Final Office Action mailed Dec. 14, 2015 for U.S. Appl. No. 13/298,506, of Lamba, K, et al., filed Nov. 17, 2011.
Notice of Allowance mailed Jan. 12, 2016 for U.S. Appl. No. 13/298,534, of Lamba, K., et al., filed Nov. 17, 2011.
Final Office Action mailed Jan. 15, 2016, for U.S. Appl. No. 29/493,212, of Edwards, T., et al., filed Jun. 6, 2014.
Advisory Action mailed Sep. 11, 2015 for U.S. Appl. No. 13/298,506, of Lamba, K., et al., filed Nov. 17, 2011.
Notice of Allowance mailed Sep. 16, 2015 for U.S. Appl. No. 14/551,681, of Wade, J., et al., filed Nov. 24, 2014.
Notice of Allowance mailed Oct. 5, 2015 for U.S. Appl. No. 14/322,815, of Edwards, T., filed Jul. 2, 2014.
Notice of Allowance mailed Oct. 6, 2015 for U.S. Appl. No. 13/298,491, of Lamba, K., et al., filed Nov. 17, 2011.
Notice of Allowance mailed Oct. 7, 2015 for U.S. Appl. No. 13/298,510, of Lamba, K., et al., filed Nov. 17, 2011.
Notice of Allowance mailed Oct. 8, 2015 for U.S. Appl. No. 13/298,487, of Lamba, K., et al., filed Nov. 17, 2011.
Notice of Allowance mailed Oct. 13, 2015 for U.S. Appl. No. 14/578,107, of Wade, J., et al., filed Dec. 19, 2014.
Non-Final Office Action mailed Oct. 29, 2015 for 14/512,104, of Templeton, T., et al., filed Oct. 10, 2014.
Non-Final Office Action mailed Nov. 21, 2013, for U.S. Appl. No. 14/052,009, of Wilson, M., et al., filed Oct. 11, 2013.
Non-Final Office Action mailed Jul. 19, 2012, for U.S. Appl. No. 12/903,758, of Wilson, M., et al., filed Oct. 13, 2010.
"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.

(56) References Cited

OTHER PUBLICATIONS

Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Credit Card Swiper and Reader for iPhone, iPad, Blackberry," Android and more, Retrieved from the Internet URL: http://hubpages.com/hub/Credit-Card-Swiper-and-Reader-for-iPhone-iPad-Blackberry-An . . . , on Apr. 20, 2011, pp. 1-2.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
"Arduino magnetic stripe decoder," Instructables, Retrieved from the Internet URL: http://www.instructables.com/id/Arduino-magneticstripe-decorder/, on Feb. 8, 2011, pp. 1-5.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Pay©PC," Retrieved from the Internet URL: http://www.merchantanywhere.com/PAY_AT_PCT@PC.htm, on Feb. 11, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.

"TOUCH-PAY Wireless Credit Card Processing," MerchantSeek, Retrieved from the Internet URL: http://www.merchantseek.com/wireless-credit-card-processing.htm, on Feb. 11, 2011, pp. 1-5.
"Announcement: Semtek Introduces Side Swipe II Card Reader for Wireless Devices," Brighthand, Retrieved from the Internet URL: http://forum.brighthand.com/pdas-handhelds/173285-announce-ment-semtek-introduces-sid . . . , on Apr. 19, 2011, pp. 1-2.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-process-ing-app-for-authorizenet-and-paypal-payflow-pro-for-curve-8350-8500-890-download-2075.html, on Mar. 30, 2015, pp. 1-4.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
"Headphone Jack (3.5mm)," Retrieved from the Internet URL: http://www.phonescoop.com/glossary/term.php?gid=440, on May 5, 2011, pp. 1-1.
"2.5mm Headset Jack," Retrieved from the Internet URL: http://www.phonescoop.com/glossary/term.php?gid=360, on May 5, 2011, pp. 1-1.
"Reference Designations for Electrical and Electronics Parts and Equipment," Engineering Drawing and Related Documentation Practices, ASME Y14.44-2008, The American Society of Mechanical Engineers, Nov. 21, 2008, pp. 1-31.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
"Mag-stripe readers the hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Website: www.alexwinston.com, Aug. 31, 2009, pp. 1-5.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic stripe reader/writer," Retrieved from the Internet URL: http://www.gae.ucm.es/-padilla/extrawork/stripe.html, on Dec. 21, 2009, pp. 1-2.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
European Search Report and Opinion for European Patent Application No. 11 786 731.7, mailed Mar. 28, 2014.
Office Action for European Patent Application No. 11 786 731.7, mailed Jul. 16, 2015.
Non-Final Office Action mailed Sep. 30, 2011, for U.S. Appl. No. 12/903,753, of McKelvey, J., et al., filed Oct. 13, 2010.
Final Office Action mailed Jul. 6, 2012, for U.S. Appl. No. 12/903,753, of McKelvey, J., et al., filed Oct. 13, 2010.
Non-Final Office Action mailed Jul. 8, 2013, for U.S. Appl. No. 12/903,753, of McKelvey, J., et al., filed Oct. 13, 2010.
Notice of Allowance mailed Oct. 10, 2013, for U.S. Appl. No. 12/903,753, of Mckelvey, J., filed Oct. 13, 2010.
Final Office Action mailed Apr. 24, 2013, for U.S. Appl. No. 12/903,758, of Wilson, M., et al., filed Oct. 13, 2010.
Notice of Allowance mailed Aug. 6, 2013, for U.S. Appl. No. 12/903,758, of Wilson, M., et al., filed Oct. 13, 2010.
Notice of Allowance mailed Apr. 4, 2014, for U.S. Appl. No. 14/052,009, of Wilson, M., et al., filed Oct. 11, 2013.
Notice of Allowance mailed Jul. 30, 2014, for U.S. Appl. No. 14/052,009, of Wilson, M., et al., filed Oct. 11, 2013.

(56) References Cited

OTHER PUBLICATIONS

Non-Final Office Action mailed Sep. 30, 2011, for U.S. Appl. No. 13/010,976, of Babu, A. R., et al., filed Jan. 21, 2011.
Final Office Action mailed Jun. 12, 2012, for U.S. Appl. No. 13/010,976, of Babu, A. R., et al., filed Jan. 21, 2011.
Notice of Allowance mailed Aug. 28, 2015, for U.S. Appl. No. 13/298,510, of Lamba, K. et al., filed Nov. 17, 2011.
Non-Final Office Action mailed Sep. 11, 2014, for U.S. Appl. No. 13/298,510, of Lamba, K. et al., filed Nov. 17, 2011.
Final Office Action mailed May 6, 2015, for U.S. Appl. No. 13/298,510, of Lamba, K. et al., filed Nov. 17, 2011.
Final Office Action mailed Jul. 9, 2012, for U.S. Appl. No. 13/005,822, of McKelvey, J., et al., filed Jan. 13, 2011.
Non-Final Office Action mailed Jun. 18, 2013, for U.S. Appl. No. 13/005,822, of McKelvey, J., et al., filed Jan. 13, 2011.
Non-Final Office Action mailed Dec. 10, 2013, for U.S. Appl. No. 13/005,822 of McKelvey, J., et al., filed Jan. 13, 2011.
Non-Final Office Action mailed Oct. 7, 2011, for U.S. Appl. No. 13/043,258, of McKelvey, J., filed Mar. 8, 2011.
Final Office Action mailed Jul. 13, 2012, for U.S. Appl. No. 13/043,258, of McKelvey, J., filed Mar. 8, 2011.
Non-Final Office Action mailed Dec. 11, 2013, for U.S. Appl. No. 13/043,258, of McKelvey, J., filed Mar. 8, 2011.
Notice of Allowance mailed Jul. 1, 2014, for U.S. Appl. No. 13/043,258, of McKelvey, J., filed Mar. 8, 2011.
Advisory Action mailed Aug. 15, 2012, for U.S. Appl. No. 13/043,258, of McKelvey, J., filed Mar. 8, 2011.
Advisory Action mailed Aug. 17, 2012, for U.S. Appl. No. 13/005,822, of McKelvey, J.,et al., filed Jan. 13, 2011.
Notice of Allowance mailed Jun. 24, 2014, for U.S. Appl. No. 13/005,822, of McKelvey, J., et al., filed Jan. 13, 2011.
Non-Final Office Action mailed Oct. 7, 2014, for U.S. Appl. No. 13/298,534, of Lamba, K., et al., filed Nov. 17, 2011.
Final Office Action mailed Apr. 8, 2015, for U.S. Appl. No. 13/298,534, of Lamba, K., et al., filed Nov. 17, 2011.
Final Office Action mailed Sep. 6, 2013, for U.S. Appl. No. 13/298,560, of Lamba K. et al., filed Nov. 17, 2011.
Advisory Action mailed Oct. 21, 2013, for U.S. Appl. No. 13/298,560 of Lamba K. et al., filed Nov. 17, 2011.
Final Office Action mailed Aug. 15, 2013, for U.S. Appl. No. 13/043,263, of McKelvey, J., filed Mar. 8, 2011.
Advisory Action mailed Nov. 8, 2013, for U.S. Appl. No. 13/043,263, of McKelvey, J., filed Mar. 8, 2011.
Non-Final Office Action mailed Feb. 24, 2014, for U.S. Appl. No. 13/043,263, of McKelvey, J., filed Mar. 8, 2011.
Notice of Allowance mailed Jul. 15, 2014, for U.S. Appl. No. 13/043,263, of McKelvey, J., filed Mar. 8, 2011.
Non-Final Office Action mailed Jul. 22, 2014, for U.S. Appl. No. 13/298,560, of Lamba K. et al., filed Nov. 17, 2011.
Final Office Action mailed Jan. 28, 2015, for U.S. Appl. No. 13/298,560, of Lamba K. et al., filed Nov. 17, 2011.
Non-Final Office Action mailed Oct. 11, 2011, for U.S. Appl. No. 13/043,203, of McKelvey. J., et al., filed Mar. 8, 2011.
Final Office Action mailed Jul. 6, 2012, for U.S. Appl. No. 13/043,203, of McKelvey. J., et al., filed Mar. 8, 2011.
Non-Final office Action mailed Oct. 11, 2011, for U.S. Appl. No. 13/043,263, of McKelvey, J., filed Mar. 8, 2011.
Advisory Action mailed Aug. 1, 2012, for U.S. Appl. No. 13/043,203, of McKelvey, J., filed Mar. 8, 2011.
Advisory Action mailed Aug. 16, 2012, for U.S. Appl. No. 13/043,263, of McKelvey, J., filed Mar. 8, 2011.
Non-Final Office Action mailed Apr. 29, 2013, for U.S. Appl. No. 13/043,263, of McKelvey, J., filed Mar. 8, 2011.
Non-Final office Action mailed Apr. 30, 2013, for U.S. Appl. No. 13/043,203, of McKelvey, J., filed Mar. 8, 2011.
Non-Final Office Action mailed May 28, 2013, for U.S. Appl. No. 13/298,560, of Lamba K. et al., filed Nov. 17, 2011.
Notice of Allowance mailed Jul. 9, 2013, for U.S. Appl. No. 13/043,203, of McKelvey, J., filed Mar. 8, 2011.
Non-Final Office Action mailed Jul. 6, 2015, for U.S. Appl. No. 13/298,534, of Lamba K. et al., filed Nov. 17, 2011.
Advisory Action mailed Apr. 9, 2015, for U.S. Appl. No. 13/298,560, of Lamba K. et al., filed Nov. 17, 2011.
Final office Action mailed Jul. 9, 2012, for U.S. Appl. No. 13/043,263, of McKelvey, J., filed Mar. 8, 2011.
Non-Final Office Action mailed Jul. 16, 2015, for U.S. Appl. No. 13/298,560, of Lamba K. et al., filed Nov. 17, 2011.
Application for Registration of an Industrial Design Examiner's Report for Canadian Design Application No. 159528, mailed Jun. 11, 2015.
English-language translation of Notice of Reasons for Rejection for Japanese Application No. 2014-0255525, mailed Mar. 31, 2015.
Certificate of Registration of Design for Indian Design Application No. 267386 mailed Nov. 14, 2014 (Registration No. 39149).
Non-Final Office Action mailed Jul. 27, 2015, for U.S. Appl. No. 29/493,212, of Edwards, T., et al., filed Jun. 6, 2014.
English-language translation of Decision of Final Rejection for Japanese Patent Application No. 2013-533897, mailed Feb. 23, 2015.
English-language translation of Office Action for Japanese Patent Application No. 2013-533897, mailed Jun. 5, 2014.
English-language translation of Search Report for Japanese Patent Application No. 2013-533897, mailed Apr. 14, 2014.
Certificate of Design Registration for European Patent Application No. 002578674, mailed Nov. 14, 2014 (Registration No. 002578674-0001).
Notice of Allowance mailed Sep. 2, 2015, for U.S. Appl. No. 14/578,107, of Wade, J. et al., filed Dec. 19, 2014.
Advisory Action mailed Aug. 24, 2012, for U.S. Appl. No. 13/010,976, of Babu, A. R., et al., filed Jan. 21, 2011.
Non-Final Office Action mailed Aug. 15, 2014, for U.S. Appl. No. 13/010,976, of Babu, A. R., et al., filed Jan. 21, 2011.
Notice of Allowance mailed Dec. 24, 2014, for U.S. Appl. No. 13/010,976, of Babu, A. R., et al., filed Jan. 21, 2011.
Non-Final Office Action mailed Apr. 2, 2014, for U.S. Appl. No. 14/012,655, of McKelvey, J., filed Aug. 28, 2013.
Final Office Action mailed Aug. 15, 2014, for U.S. Appl. No. 14/012,655, of McKelvey, J., filed Aug. 28, 2013.
Non-Final Office Action mailed Jan. 20, 2015, for U.S. Appl. No. 14/012,655, of McKelvey, J., filed Aug. 28, 2013.
Notice of Allowance mailed Sep. 1, 2015, for U.S. Appl. No. 13/298,487, of Babu, A., et al., filed Nov. 17, 2011.
Non-Final Office Action mailed Apr. 29, 2013, for U.S. Appl. No. 13/298,487, of Babu, A., et al., filed Nov. 17, 2011.
Final Office Action mailed Aug. 22, 2013, for U.S. Appl. No. 13/298,487, of Babu, A., et al., filed Nov. 17, 2011.
Advisory Action mailed Oct. 22, 2013, for U.S. Appl. No. 13/298,487, of Babu, A., et al., filed Nov. 17, 2011.
Non-Final Office Action mailed Aug. 21, 2014, for U.S. Appl. No. 13/298,487, of Babu, A., et al., filed Nov. 17, 2011.
Final Office Action mailed Mar. 18, 2015, for U.S. Appl. No. 13/298,487, of Babu, A., et al., filed Nov. 17, 2011.
Non-Final Office Action mailed Feb. 20, 2015, for U.S. Appl. No. 14/512,104, of Templeton, T., et al., filed Oct. 10, 2014.
International Search Report and Written Opinion for PCT Application No. PCT/US2010/052483, mailed Jun. 10, 2011.
International Search Report and Written Opinion for PCT Application No. PCT/US2011/055386, mailed Feb. 22, 2012.
European Search Report and Opinion for European Application No. 11833172.7, mailed Apr. 22, 2014.
International Search Report and Written Opinion for PCT Application No. PCT/US2014/069788, mailed May 14, 2015.
International Search Report and Written Opinion for PCT Application No. PCT/US2012/064782, mailed Feb. 26, 2013.
International Search Report and Written Opinion for PCT Application No. PCT/US2010/052481, mailed Jun. 23, 2011.
International Search Report and Written Opinion for PCT Application No. PCT/US2014/067074, mailed Mar. 15, 2015.
Examination Report for Canadian Application No. 2,812,594, mailed on Feb. 24, 2015.
Examination Report No. 1 for Australian Application No. 201415781, mailed on Feb. 23, 2015 (Registration No. 359005).

(56) References Cited

OTHER PUBLICATIONS

"Review: Square, Inc. Square Credit Card Reader (2013)," iLounge, Retrieved from the Internet URL: http://www.ilounge.com/index.php/reviews/entry/square-inc.-square-credit-card-reader-2013/, on Jan. 16, 2014, pp. 3.

"TUAW The Unofficial Apple Weblog, Square credit card reader loses weight, gains accuracy", Retrieved from the Internet URL: http://www.tuaw.com/2013/12/09/square-credit-card--reader-loses-weight-gains-accuracy/, on Dec. 9, 2013, p. 1.

Examination Report No. 2 for Australian Application No. 201415781, mailed Aug. 13, 2015 (Registration No. 359005).

Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.

Notification of Registration of a Design for Australian Application No. 201415781, mailed on Nov. 27, 2014 (Registration No. 359005).

First Examination Report for Indian Design Application No. 267386, mailed Feb. 5, 2015.

Non-Final Office Action mailed Apr. 25, 2013, for U.S. Appl. No. 13/298,491, of Lamba, K., et al., filed Nov. 17, 2011.

Final Office Action mailed Sep. 17, 2013, for U.S. Appl. No. 13/298,491, of Lamba, K., et al., filed Nov. 17, 2011.

Advisory Action mailed Oct. 22, 2013, for U.S. Appl. No. 13/298,491, of Lamba, K., et al., filed Nov. 17, 2011.

Non-Final Office Action mailed Jul. 17, 2014, for U.S. Appl. No. 13/298,491, of Lamba, K., et al., filed Nov. 17, 2011.

Final Office Action mailed Feb. 4, 2015, for U.S. Appl. No. 13/298,491, of Lamba, K., et al., filed Nov. 17, 2011.

Notice of Allowance mailed Jun. 22, 2015, for U.S. Appl. No. 13/298,491, of Lamba, K., et al., filed Nov. 17, 2011.

Non-Final Office Action mailed Jun. 6, 2014, for U.S. Appl. No. 14/231,598, of Wade, J., et al., filed Mar. 31, 2014.

Non-Final Office Action mailed Apr. 10, 2015, for U.S. Appl. No. 14/189,997, of Lamfalusi, M., et al., filed Feb. 25, 2014.

Notice of Allowance mailed Nov. 25, 2014, for U.S. Appl. No. 14/231,598, of Claude, J.B., et al., filed Mar. 31, 2014.

Non-Final Office Action mailed Jun. 22, 2015, for U.S. Appl. No. 14/322,815, of Edwards, T., filed Jul. 2, 2014.

Notice of Allowance mailed Aug. 1, 2014, for U.S. Appl. No. 14/203,463, of Wade, J., et al., filed Mar. 10, 2014.

Notice of Allowance mailed Aug. 27, 2015, for U.S. Appl. No. 13/298,501, of Babu, A., et al., filed Nov. 17, 2011.

Non-Final Office Action mailed Sep. 11, 2014, for U.S. Appl. No. 13/298,501, of Babu, A., et al., filed Nov. 17, 2011.

Final Office Action mailed May 6, 2015, for U.S. Appl. No. 13/298,501, of Babu, A., et al., filed Nov. 17, 2011.

Notice of Allowance mailed Oct. 17, 2014, for U.S. Appl. No. 14/220,967, of Wade, J., et al., filed Mar. 20, 2014.

Notice of Allowance mailed Dec. 18, 2014, for U.S. Appl. No. 14/220,967, of Wade, J., et al., filed Mar. 20, 2014.

Notice of Allowance mailed May 19, 2015, for U.S. Appl. No. 14/620,765, of Wade, J., et al., filed Feb. 12, 2015.

Non-Final Office Action mailed May 26, 2015, for U.S. Appl. No. 14/551,681, of Wade, J., et al., filed Nov. 24, 2014.

Notice of Allowance mailed Jun. 10, 2014, for U.S. Appl. No. 29/491,147, of Templeton T., et al., filed May 16, 2014.

Non-Final Office Action mailed Sep. 11, 2014, for U.S. Appl. No. 13/298,506, of Lamba, K., et al., filed Nov. 17, 2011.

Final Office Action mailed May 6, 2015, for U.S. Appl. No. 13/298,506, of Lamba, K., et al., filed Nov. 17, 2011.

Non-Final Office Action mailed Sep. 30, 2011, for U.S. Appl. No. 13/005,822, of McKelvey, J., et al., filed Jan. 13, 2011.

Notice of Allowance mailed Jun. 3, 2016, for U.S. Appl. No. 14/942,515, of Lamba, K., et al., filed Nov. 16, 2015.

Notice of Allowance mailed Jun. 13, 2016, for U.S. Appl. No. 14/979,407, of Lamfalusi, M., et al., filed Dec. 27, 2015.

Notice of Allowance mailed Jun. 14, 2016, for U.S. Appl. No. 14/942,515, of Lamba, K., et al., filed Nov. 16, 2015.

Non-Final Office Action mailed Apr. 7, 2016, for U.S. Appl. No. 13/298,506, of Lamba, K., et al., filed Nov. 17, 2011.

Advisory Action mailed Apr. 14, 2016, for U.S. Appl. No. 13/298,560, of Lamba, K., et al., filed Nov. 17, 2011.

Non-Final Office Action mailed May 6, 2016, for U.S. Appl. No. 14/512,104, of Templeton, T., et al., filed Oct. 10, 2014.

Notice of Allowance mailed May 10, 2016, for U.S. Appl. No. 14/942,515, of Lamba, K., et al., filed Nov. 16, 2015.

Non-Final Office Action mailed May 19, 2016, for U.S. Appl. No. 13/298,560, of Lamba, K., et al., filed Nov. 17, 2011.

Office Action for Canadian Patent Application No. 2,920,589, mailed Mar. 11, 2016.

Office Action for European Patent Application No. 11 833 172.7, mailed May 17, 2016.

Notice of Allowance mailed Sep. 22, 2016, for U.S. Appl. No. 13/298,506, of Lamba, K, et al., filed Nov. 17, 2011.

Notice of Allowance mailed Oct. 7, 2016, for U.S. Appl. No. 14/512,104, of Templeton, T., et al., filed Oct. 10, 2014.

Extended European Search Report for European Patent Application No. 16155374.8, mailed Oct. 11, 2016.

Notice of Allowance mailed Oct. 26, 2016, for U.S. Appl. No. 15/013,937, of Lamba, K., et al., filed Feb. 2, 2016.

Corrected Notice of Allowance mailed Nov. 1, 2016, for U.S. Appl. No. 14/512,104, of Templeton, T., et al., filed Oct. 10, 2014.

Final Office Action mailed Nov. 3, 2016, for U.S. Appl. No. 13/298,560, of Lamba, K., et al., filed Nov. 17, 2011.

International Search Report and Written Opinion, for PCT Application No. PCT/US2015/045772, mailed Nov. 6, 2015.

Certificate of Design Registration for Japanese Design Application No. 2014-255525, mailed on Jun. 24, 2016 (Registration No. 1554745).

Notice of Acceptance for Australian Patent Application No. 2014362287, mailed on Jun. 30, 2016.

Office Action for Canadian Patent Application No. 2,932,849, mailed on Jul. 13, 2016.

Office Action for Brazilian Design Application No. 3020140057308, mailed on Jul. 26, 2016.

Non-Final Office Action mailed Jun. 30, 2016 for U.S. Appl. No. 15/066,496, of Babu, A., et al., filed Mar. 10, 2016.

Non-Final Office Action mailed Jul. 1, 2016, for U.S. Appl. No. 15/013,937, of Lamba, K., et al., filed Feb. 2, 2016.

Notice of Allowance mailed Jul. 14, 2016, for U.S. Appl. No. 14/942,515, of Lamba, K., el al., filed Nov. 16, 2015.

Non-Final Office Action mailed Aug. 16, 2016, for U.S. Appl. No. 14/312,524, of Edwards, T., filed Jun. 23, 2014.

Non-Final Office Action mailed Aug. 17, 2016, for U.S. Appl. No. 14/985,624, of Wade, J., et al., filed Dec. 31, 2015.

Notice of Allowance mailed Aug. 26, 2016, for U.S. Appl. No. 13/298,506, of Lamba, K., et al., filed Nov. 17, 2011.

Notice of Allowance mailed Jan. 12, 2017, for U.S. Appl. No. 14/985,624, of Wade, J., et al., filed Dec. 31, 2015.

Non-Final Office Action mailed Jan. 17, 2017, for U.S. Appl. No. 14/463,455, of Skoog, L, tiled Augus 19, 2014.

* cited by examiner

POWER HARVESTING IN READER DEVICES

CROSS-REFERENCE TO RELATED APPLICATIONS

This application claims the benefit of U.S. Provisional Patent Application No. 61/914,762, entitled "POWER HARVESTING IN READER DEVICES", filed on Dec. 11, 2013, and which is hereby expressly incorporated herein by reference in its entirety.

BACKGROUND

The ubiquity of headphone ports makes them an attractive option for use as communication channels for attachable hardware devices. For example, 3.5 mm audio ports are standard on many electronic devices and in particular, mobile devices such as smart phones and tablet computers. Such audio ports can be used to provide communication between a host device and a hardware attachment, such as an attachable card reader (e.g., a "reader") used for reading information from a payment card.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
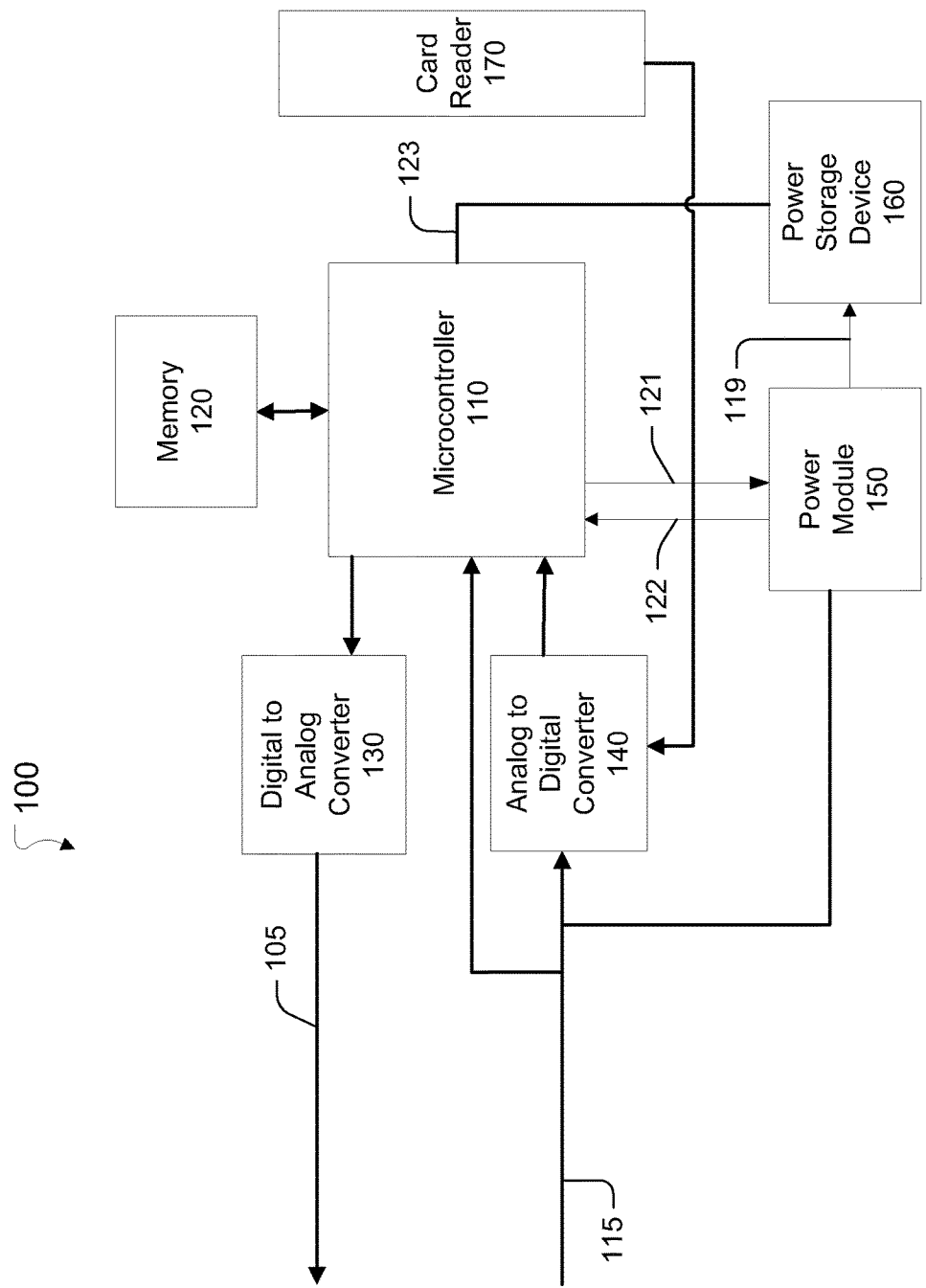
FIG. 1 illustrates a conceptual block diagram of hardware components used to facilitate power harvesting from an audio signal.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear that the subject technology is not limited to the specific details set forth herein and may be practiced without these specific details. In some instances, structures and components are shown in block diagram form in order to avoid obscuring the concepts of the subject technology.

Due to limitations in using audio ports for data transport, some conventional readers are restricted to unidirectional communication and are only capable of sending signals to a host mobile device (and not receiving them). As a consequence, audio signals that may be transmitted on the audio bus (e.g., via left and/or right audio channels), are ignored or otherwise unused. Furthermore, while in some conventional reader implementations, the reader is configured to draw power from the microphone channel (which is typically powered for the purpose of driving power to a microphone amplifier), conventional reader devices typically have no other source of power. It would be advantageous to deliver an increased amount of power to the reader during the course of normal reader operation and without requiring separate charging to be performed by a user.

Systems and methods in accordance with various aspects of the present disclosure overcome one or more of the above-referenced and other deficiencies in conventional reader powering. In particular, aspects of the technology provide solutions for harvesting power from an audio bus to produce a DC output from audio signals received on left and/or right audio channels, included in standard 3.5 mm audio channels. As discussed in further detail below, power harvested from audio signaling can be used to directly power component parts of a reader, and in some implementations, can be stored for later use, for example, using a power storage device such as a rechargeable battery.

Implementations of the subject technology provide methods and systems for harvesting DC power from audio signals received by a reader over an audio channel that is coupled to a standard 3.5 mm audio port or plug. In certain aspects, one or more transistors, such as field effect transistors (FETs), can be used to perform synchronous rectification on received audio signals. Synchronous rectification can be used to rectify the full wave of a received audio signal, including negative voltage components. By using synchronous rectification, power conversion (e.g., into a DC output) can be accomplished more efficiently as compared to conventional diode rectification techniques, which incur a greater power loss due to the relatively high voltage differential required for diode biasing.

As discussed in further detail below, power harvesting from audio signals is performed in a manner wherein switching of a power module (e.g., transistors of a synchronous rectification circuit), is controlled to correspond with variations in the received signal. For example, by detecting a frequency of the incoming audio signal, a microcontroller can predict time periods in which a voltage of the received signal is negative. Accordingly, the microcontroller can provide signaling (e.g., a "reference signal") indicating when synchronous rectification should be performed.

FIG. 1 illustrates a conceptual block diagram of example hardware components of a reader 100 configured to harvest power from received audio signals, according to some aspects. Reader 100 includes microcontroller 110, memory 120, digital-to-analog converter (DAC) 130, analog-to-digital converter (ADC) 140, power module 150, power storage device 160, and card reader 170.

As illustrated, microcontroller 110 is coupled to memory 120, DAC 130 and ADC 140. Additionally, microcontroller 110 is communicatively coupled to power module 150, via reference channel 121 and DC output line 122. Microcontroller 110 is further coupled to power storage device 160, via DC output line 123, as well as to card reader 170, via ADC 140. As further illustrated in the example of FIG. 1, reader 100 is coupled to an audio bus comprising microphone channel 105 and audio channel 115. Specifically, DAC 130 is coupled to microphone channel 105, configured to transmission of signaling to a host device (e.g., as an output from reader 100), whereas ADC 140 is coupled to audio channel 115, for reception of audio signaling from the host device.

Reader 100 can be implemented using various other hardware components and/or configurations, and is not limited to the architecture depicted in the example of FIG. 1. For example, microcontroller 110 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Additionally, various types of memory can be utilized in place of, or in addition to, memory 120. Similarly, one or more sequences of instructions may be stored as firmware on a ROM within microcontroller 110. One or more sequences of instructions can also be software stored and read from another storage medium, such as the flash memory array, or received from a host device (e.g., a mobile device such as a smart phone or tablet computing device) via a host interface, such as audio channel 115. ROM, storage mediums, and flash memory arrays represent examples of machine or computer readable media storing instructions/code executable by microcontroller 110. Machine or computer readable media may generally refer to any medium or media used to provide instructions to microcontroller 110, including both volatile media, such as dynamic memory used for storage media or for buffers within microcontroller 110, and non-volatile media, such as electronic media, optical media, and magnetic media.

Taken together, microphone channel 105 and audio channel 115 can form a portion of an audio bus incorporating a standard 3.5 mm audio plug (not shown). In some implementations, audio channel 115 can include multiple audio channels, such as a left-speaker channel and a right-speaker channel of a 3.5 mm headphone port.

Audio signaling received on audio channel 115 is provided to power module 150 and microcontroller 110. The audio signaling can be provided directly to a pin of microcontroller 110, in an embodiment in which microcontroller 110 has an audio analysis component (e.g., a component to analyze positive and negative voltages, etc.), or can be provided indirectly to a pin of microcontroller 110 via a transistor buffer (not shown) for lifting the audio signal above ground. Thus, the audio signaling received by microcontroller 110 can be analyzed and used to provide a reference signal to power module 150 (e.g., via reference channel 121), so that parameters of power module 150 can be altered in order to rectify the received audio signals in an efficient manner to produce a DC output from the received audio waveform. In this way, microcontroller 110 "listens" to the received AC waveform, and controls power module 150 (e.g., using a reference signal) in order to perform synchronous rectification on the received audio signals at proper time intervals.

Although synchronous rectification performed by power module 150 can be achieved using different circuit implementations, in certain aspects one or more FETs can be used, as discussed in further detail with respect to FIG. 2, below. Transistor based synchronous rectification techniques provide advantages over conventional diode rectification by mitigating the relatively high voltage drops experienced when transferring power over a typical diode p-n junction.

Because transistor biasing can be affected by a ground state voltage of microcontroller 110, in certain aspects, changes in the (floating) ground state voltage of microcontroller 110 can be self-timed (e.g., by microcontroller 110), for example, based on the received audio signal/transistor biasing. Thus, in addition to controlling synchronous rectification of power module 150, microcontroller 110 is also configurable to alter its ground state voltage based on audio signaling received via audio channel 115. Further, because transistor biasing can be affected by a ground state voltage of microcontroller 110, in one embodiment power module 150 is at least partially electrically isolated (by, e.g., the use of an optical interconnect on reference channel 121, etc.) from microcontroller 110, to help ensure the proper operation of power module 150.

In certain aspects, after received audio signaling is rectified the resulting DC power is outputted from power module 150. Although the DC power can be used to provide power to any component of reader 100, in some implementations the DC power is provided directly to microcontroller 110, e.g., via DC output line 122.

In other implementations, the DC power output by power module 150 is provided to power storage device 160 (via DC output line 119), and stored for future use by reader 100. For example, charge stored by power storage device 160 can later be provided to microcontroller 110 via DC output line 123. Power storage device 160 can include any type of charge storage device or material, such as a capacitor or inductive network; however, in some implementations, power storage device 160 includes a rechargeable battery for storing charge even when all external power to reader 100 is cut off.

Additionally, although in the example of FIG. 1 power storage device 160 is shown to be coupled solely to power module 150 and microcontroller 110, it is understood that in other implementations power storage device can be coupled to additional/different components of reader 100. By way of example, power storage device can be configured to provide DC power to card reader 170 to facilitate reading of a payment card used in a financial transaction.

DC output line 123 can be used to carry signaling between power storage device 160 and microcontroller 110. Using DC output line 123, microcontroller 110 can be configured to detect a power level of power storage device 160, for example, to determine if/when power storage device 160 is in a low power state. Determinations of a low power state of power storage device 160 may be made if/when an amount of charge stored by power storage device 160 is determined to be below a predetermined threshold. In some implementations, the detection of a low power state of power storage device 160 can be used to determine whether power output by power module 150 should be used to charge power storage device 160, or delivered directly to one or more other components of reader 100.

Figure 2:
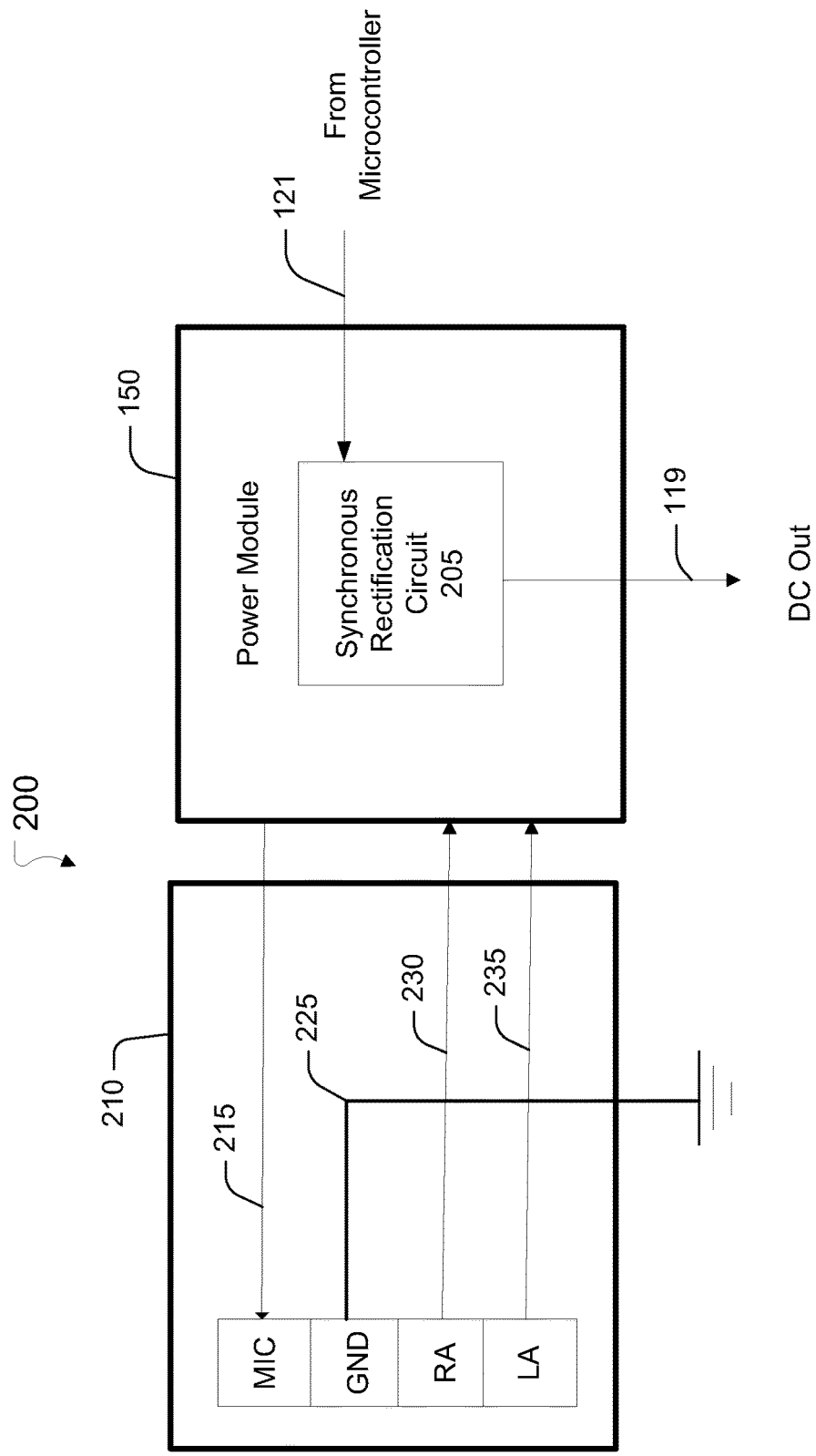
FIG. 2 illustrates a conceptual block diagram of the coupling between an audio bus and a power module, according to some implementations of the subject technology.

A more detailed example of a power module, as well as the power module's connection to an audio bus, is illustrated by the conceptual block diagram of circuit 200 in FIG. 2. As depicted, circuit 200 includes an audio bus 210, comprising microphone channel 215, ground 225, right audio channel 230, and left audio channel 235. Circuit 200 further depicts that power module 150 is coupled to audio bus 210. Power module 150 includes synchronous rectification circuit 205 having DC output line 119 for carrying DC output power. Synchronous rectification circuit 205 is also coupled to reference channel 121, e.g., to receive a reference signal from a microcontroller (e.g., microcontroller 110), not shown. As discussed above, the reference signal provided by microcontroller 110 can be used to indicate information about voltage levels and timing of a received audio signal necessary for properly biasing one or more transistors of synchronous rectification circuit 205. In certain aspects, power module 150 may be implemented using FET transistors, for example in a 'H' bridge configuration; however, it is understood that various synchronization circuit configurations can be implemented without departing from the scope of the subject technology.

As discussed above, DC output line 119 can be used to provide DC power to any portion or component of a reader, including either directly to a microcontroller, or a power storage device, such as a rechargeable battery.

Figure 3:
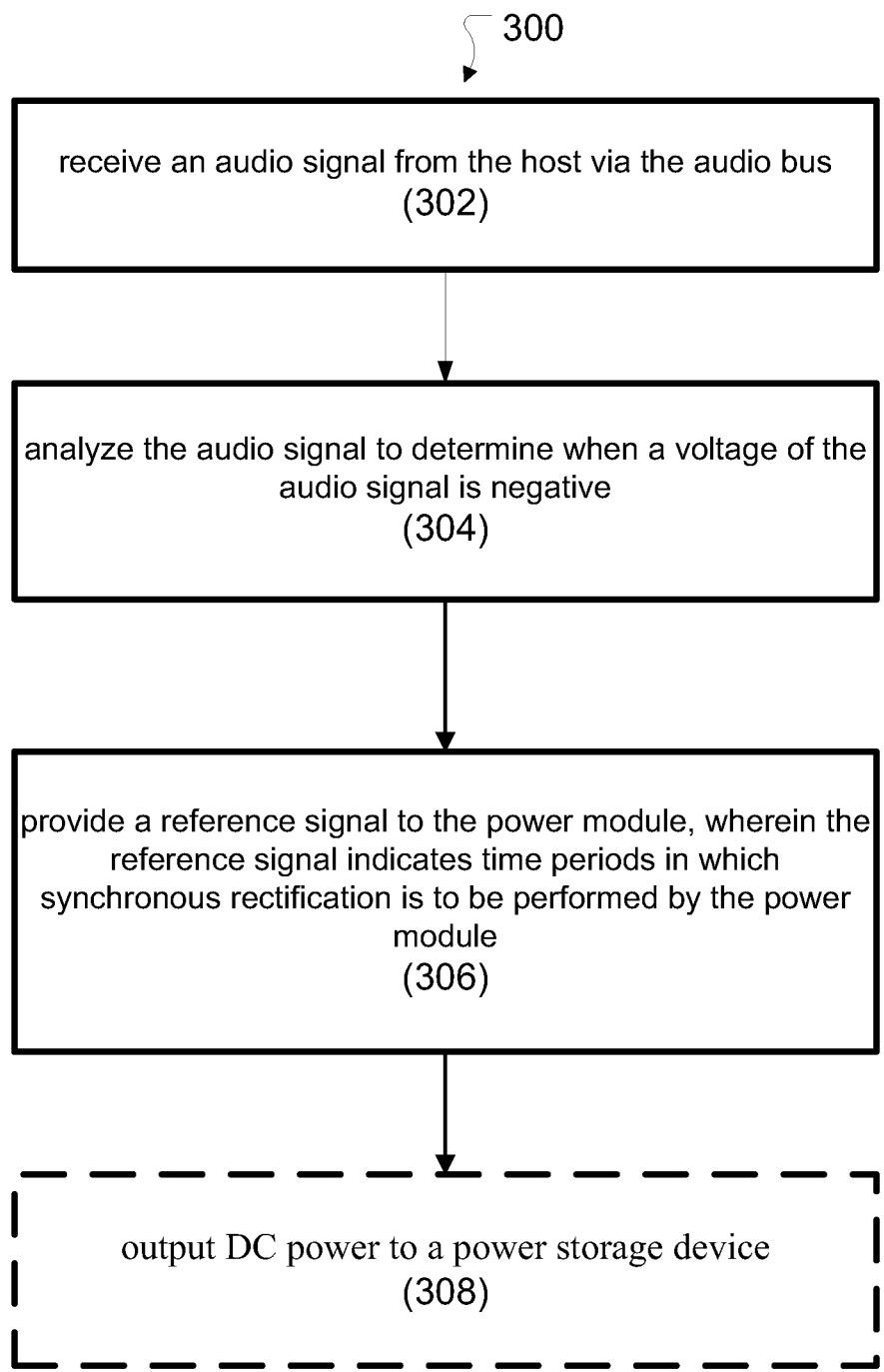
FIG. 3 illustrates an example process in which DC power is harvested from an audio signal received by a reader.

An example, of steps of a process for engaging in synchronous rectification of an audio signal is illustrated in process 300 depicted in FIG. 3. Process 300 begins with step 302 in which an audio signal is received from a host device, e.g., via an audio bus. As used herein, a host device can include any device configured for transmitting audio signals and that may be communicatively coupled to the reader via an audio channel. By way of example, a host can be any device with a headphone port configured to accept insertion of a standard 3.5 mm audio plug and may include, but is not limited to: smart phones, tablet computers, personal computers, mobile music or MP3 players and/or portable gaming devices, etc.

In certain aspects the audio signal from the host device is received on a left and/or right audio channel of an audio bus of the 3.5 mm audio plug. The received audio signal can be provided by the host device for the purpose of transmitting data, e.g., to the reader. Alternatively, in some implementations the received audio signal may be transmitted for the purpose of providing audio signaling from which DC power can be harvested.

In step 304, the received audio signal is analyzed to determine when a voltage of the audio signal is, or will be, negative.

For synchronous biasing of the audio signal to be effective, variations in transistor biasing need to correspond with fluctuations in the voltage of the audio signal. Thus, analysis of the audio signal (e.g., by a microcontroller or processor) can be used to determine when biasing parameters (e.g., for biasing one or more transistors of a synchronous rectification circuit) should be changed.

As discussed above, a ground state voltage of the microcontroller may also need to be changed in order to perform proper transistor biasing. Thus, analysis of the received audio signal can be used not only determine how to regulate transistor biasing, but also for regulating the floating ground state voltage of the microcontroller.

In step 306 a reference signal is provided (e.g., by a microcontroller) to a power module, wherein the reference signal indicates time periods in which synchronous rectification is to be performed by the power module. The reference signal can include signaling for directly biasing one or more transistors (e.g., FETs) of the power module. Alternatively, the reference signal can convey various signal properties (e.g., frequency and/or voltage information) that are interpreted by the power module to determine how synchronous rectification is to be performed.

Subsequently, in optional step 308, DC power is output by the power module and provided to a power storage device, (e.g., power storage device 160 discussed above). Alternatively, DC power outputted by the power module can be provided to another component of the reader, such as a card reader configured for reading an integrated circuit (IC) type payment card.

The ability to increase an amount of power delivered to the reader can provide several advantages. For example, by harvesting power from received audio signals, a rechargeable storage device (e.g., power storage device 160) can be charged/researched-prolonging the useful life of the reader device. Additionally, by increasing an amount of power that is deliverable to the reader, an increased number of processing tasks may be accomplished by the reader, without the need for increasing a form factor of the reader to accommodate an enlarged power storage device.

In certain aspects, the delivery of audio signals that are harvested to produce DC power outputs can be triggered in response to a request issued by the reader device. For example, upon sensing a low power state of a power storage device, the microcontroller can request an audio signal (e.g., from a host device), so that the audio signal can harvested (i.e., rectified), to provide DC power necessary to recharge the power storage device.

Ultimately, any increased functionality and/or life provided to the reader as a result of power harvesting will enable the reader to perform its function of reading payment card information to facilitate financial transactions.

Figure 4:
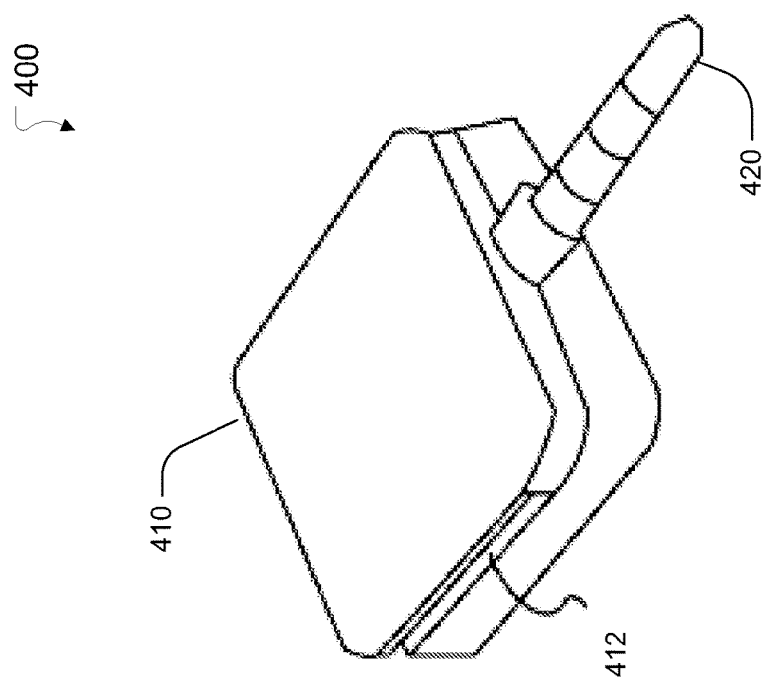
FIG. 4 illustrates an example reader, including an audio plug, according to some implementations.

FIG. 4 illustrates an external view of an example reader 400 according to some embodiments of the technology. Reader 400 includes housing 410 having card slot 412. As illustrated, housing 410 is coupled to audio plug 420 (e.g., a 3.5 mm audio plug).

Housing 410 contains the hardware modules, components and circuitry of reader 400, as illustrated with respect to the example of FIGS. 1 and 2. Additionally, housing 410 is designed to physically receive a payment card via slot 412. By way of example, a payment card containing a magnetic stripe may be swiped through slot 412 in order to provide payment information to reader 400. Passage of a magnetic stripe of the payment card past a read head contained in housing 410 (e.g., as part of card reader 170), can enable payment information to be received via the read head. The resulting signal provided by the read head is typically an analog signal that must be digitized e.g., using ADC 140, before the payment information is provided to microcontroller 110.

Different types of information can be read from a magnetic stripe, depending on implementation. For example, user and payment card account information can be read from track 1 and track 2 of the magnetic stripe, respectively. However, in other implementations, any track (or combination of tracks) may be read from the magnetic stripe, including any combination, or all of tracks 1, 2 and 3.

In another example, reader 400 may be configured to accept integrated circuit ("IC") cards, using slot 412. As such, slot 412 can be configured as a "dip slot" for the insertion of at least a portion of a payment card, including an integrated circuit or chip. As such, it is understood that the reader can be configured to receive other types of payment cards, and accordingly can contain additional or different hardware and/or software modules than those described above with respect to FIG. 1. By way of a non-limiting example, reader 400 can be configured to accept/read various forms of payment cards, such as those conforming to the Europay, MasterCard, and Visa (EMV) standard.

As illustrated, housing 410 is physically and communicatively coupled to audio plug 420, which can be removably inserted into a headphone port of a host device, such as a smart phone, tablet device, or the like. As discussed above with respect to FIGS. 1 and 2, audio plug 420 forms part of an audio bus that includes left and right speaker channels, a microphone channel and a ground connection. Once audio plug 420 is inserted into the headphone port of a host device, such as a smart phone, audio signaling can be received by the reader e.g., via the left/right speaker channels and microphone channel, using the methods and systems discussed above.

After successful communication has been established between the reader and its host, the reader can be used to facilitate a payment transaction, for example between a merchant and a buyer using a magnetic payment card.

Figure 5:
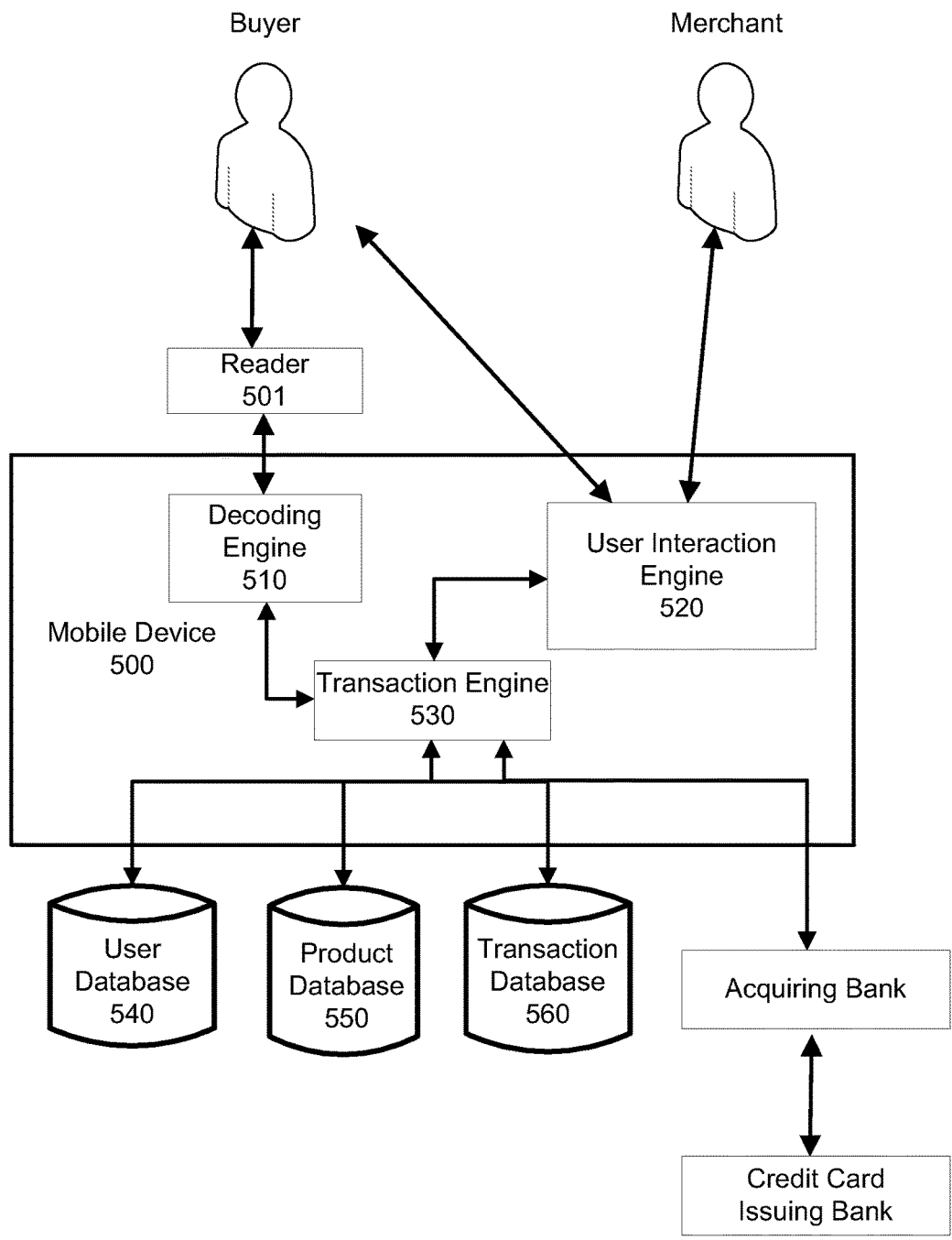
FIG. 5 depicts a conceptual environment in which a reader of the subject technology can be used to facilitate a financial transaction between a buyer and a merchant.

FIG. 5 depicts a conceptual environment in which a reader of the subject technology can be used to facilitate a financial transaction between a buyer and a merchant. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 5, the system includes a mobile device 500, a reader 501 connected to mobile device 500, a decoding engine 510, a user interaction engine 520, and a transaction engine 530, all running on mobile device 500. Additionally, the system may also include one or more of a user database 540, a product or service database 550, and a transaction database 560, all coupled to the transaction engine 530.

As used herein, the term engine refers to software, firmware, hardware, and/or other components used to effectuate a purpose. The engine will typically include software instructions that are stored in non-transitory computer-readable memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 5, mobile device 500 to which reader 501 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 500 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 530 running on mobile device 500. In response to a financial transaction between a buyer and a seller, mobile device 500 accepts information selected including but not limited to information from financial transaction or information pertaining to financial transaction card used by the buyer in the transaction. Additionally, a financial transaction device can be utilized. Non-limiting examples of financial transaction devices include but are not limited to a wristband, RFID chip, cell phone, biometric marker and the like. At least a portion of this information is communicated to a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 5, reader 501 is configured to read data encoded in a magnetic strip of a card being swiped by a buyer and send a signal that corresponds to the data read to mobile device 500. However, as discussed above, reader 501 may be configured to receive various payment card types, including but not limited to IC cards that can be provided to reader 501 using a dip slot.

The size of reader 501 can be miniaturized to be portable for connection with mobile device 500. For example, the size of reader 501 can be miniaturized to an overall length of less than 1.5". In addition, the reader 501 is also designed to reliably read the card with minimum error via a single swipe by counteracting vendor specific filtering done by mobile device 500. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A reader for receiving payment card information to facilitate a financial transaction, the reader comprising:
   an audio bus coupled to an audio plug, wherein the audio plug is configured for coupling with a headphone port of a host device to provide communication between the reader and the host device during a financial transaction in which the reader receives payment card information from a payment card and provides the payment card information to the host device via the audio plug;
   a power module coupled to the audio bus, wherein the power module is configured to perform synchronous rectification on audio signals received via the audio bus using one or more transistors of the power module to provide power to the reader during the financial transaction; and
   a microcontroller coupled to the audio bus and the power module, wherein the microcontroller is configured to perform operations for:
      receiving an audio signal from the host device via the audio bus;
      analyzing the audio signal to determine when a voltage of the audio signal is negative; and
      providing a control signal to the power module based on the analysis of the audio signal, wherein the control signal indicates when synchronous rectification is to be performed by the power module.

2. The reader of claim 1, wherein the power module is configured to output DC power to the microcontroller.

3. The reader of claim 1, further comprising:
   a power storage device coupled to the microcontroller and the power module, wherein the power module is configured to output DC power to the power storage device.

4. A method for powering a reader for receiving payment card information to facilitate a financial transaction, the method comprising:
   receiving, by a power module, an audio signal transmitted by a host via an audio bus;
   analyzing the audio signal, using a microcontroller, to determine when a voltage of the audio signal is negative; and
   providing a control signal from the microcontroller to the power module based on the analysis of the audio signal, wherein the control signal indicates time periods in which synchronous rectification is to be performed on the audio signal using one or more transistors of the power module.

5. The method of claim 4, wherein the power module is configured to output DC power to the microcontroller.

6. The method of claim 4, wherein the power module is configured to output DC power to a power storage device coupled to the power module and the microcontroller.

7. The method of claim 4, wherein the microcontroller is configured to detect a power level of a power storage device.

8. The method of claim 7, further comprising:
   detecting, by the microcontroller, a low power state of the power storage device based on the power level of the power storage device; and
   causing the power module to supply power to the power storage device, in response to the low power state.

9. The method of claim 4, further comprising:
   adjusting a ground state voltage of the microcontroller based on the audio signal.

10. The method of claim 4, further comprising:
    receiving power at a card reader from a power storage device;
    reading, using the card reader, payment information from a payment card; and
    providing the payment information to the microcontroller.

11. A non-transitory computer-readable storage medium comprising instructions stored therein, which when executed by one or more processors, cause the processors to perform operations comprising:
    analyzing an audio signal, using a microcontroller, to determine when a voltage of the audio signal is negative; and
    providing a control signal from the microcontroller to a power module based on the analysis of the audio signal, wherein the control signal indicates time periods in which synchronous rectification is to be performed using one or more transistors of the power module.

12. The non-transitory computer-readable storage medium of claim 11, wherein the power module is configured to output DC power to the microcontroller.

13. The non-transitory computer-readable storage medium of claim 11, wherein the power module is configured to output DC power to a power storage device coupled to the power module and the microcontroller.

14. The non-transitory computer-readable storage medium of claim 11, wherein the microcontroller is configured to detect a power level of a power storage device.

15. The non-transitory computer-readable storage medium of claim 14, wherein the microcontroller is further configured to perform operations comprising:
    detecting a low power state of the power storage device based on the power level; and
    causing the power module to supply power to the power storage device, in response to the low power state.

16. The non-transitory computer-readable storage medium of claim 11, the instructions further comprising:
    adjusting a ground state voltage of the microcontroller based on the audio signal.

17. The non-transitory computer-readable storage medium of claim 11, the instructions further comprising:
    receiving power at a card reader from a power storage device;
    reading, using the card reader, payment information from a payment card; and
    providing the payment information to the microcontroller.

18. The non-transitory computer-readable storage medium of claim 17, wherein the payment card comprises a magnetic stripe payment card.

19. The non-transitory computer-readable storage medium of claim 17, wherein the payment card comprises an integrated circuit (IC) type payment card.

20. The non-transitory computer-readable storage medium of claim 19, wherein the payment card comprises data conforming to a Europay, MasterCard, and Visa (EMV) standard.

* * * * *